United States Patent [19]

Goldberg et al.

[11] Patent Number: 4,873,604
[45] Date of Patent: Oct. 10, 1989

[54] FUSES HAVING SUPPRESSED VOLTAGE TRANSIENTS

[75] Inventors: Harris A. Goldberg, Colonia; Clyde C. Williams, Roselle, both of N.J.

[73] Assignee: Hoechst Celanese Corp., Somerville, N.J.

[21] Appl. No.: 750,216

[22] Filed: Jul. 1, 1985

Related U.S. Application Data

[63] Continuation-in-part of Ser. No. 487,401, Apr. 21, 1983, Pat. No. 4,642,664, and a continuation-in-part of Ser. No. 487,378, Apr. 21, 1983, Pat. No. 4,577,979.

[51] Int. Cl.$^4$ .............................................. H02H 5/04
[52] U.S. Cl. ...................................... 361/104; 361/9; 361/58; 361/91; 337/4; 337/17; 337/164
[58] Field of Search ...................... 361/88, 58, 56, 13, 361/91, 93, 111, 104, 103, 2, 3, 5, 6, 8–11; 337/17, 19, 161, 162, 164, 5

[56] References Cited

U.S. PATENT DOCUMENTS 3,484,653 12/1969 Takaoka ............................... 361/104
4,577,979 3/1986 Kalnin et al. ....................... 307/2 X

*Primary Examiner*—Todd E. DeBoer
*Attorney, Agent, or Firm*—DePaoli & O'Brien

[57] ABSTRACT

A shunt device and a method are described for protecting electrical equipment when a fuse blows. The shunt device establishes a by-pass across the fuse for permitting a limited amount of current to begin to flow at a lower voltage than the fuse blowing voltage and before the fuse blows, thereby serving as a transitory relief valve for a portion of the current while minimizing or even substantially eliminating the inductive spike when the fuse blows. The shunt device is made of at least one pyrolyzed polyacrylonitrile (PPP) fiber having a selected switching voltage so that the PPP fiber switches to a low resistance state while the fuse is blowing. When the fuse and PPP characteristics are properly matched, the rate of change of the current with time is lowered, thus selectively decreasing the size of the voltage transients which occur after the fuse blows.

6 Claims, 1 Drawing Sheet

FUSES HAVING SUPPRESSED VOLTAGE TRANSIENTS

CROSS REFERENCES TO RELATED APPLICATIONS

This application is a continuation-in-part of Ser. No. 487,401 of Harris A. Goldberg et al. entitled "Electrical Device Made of Partially Pyrolyzed Polymer" now U.S. Pat. No. 4,642,664, and of Ser. No. 87,378 of Kalnin et al, entitled "Electrical Temperature Detector and Associated Circuitry" now U.S. Pat. No. 4,577,979.

BACKGROUND OF THE INVENTION

1. Field of the Invention

This invention relates to fuses and particularly relates to fuses which protect equipment from large voltage transients upon blowing.

2. Review of the Prior Art

Fuses are widely used to protect electrical equipment, motors, instruments, electronic equipment, and the like from excessive currents resulting from sudden overloads or accidental shorts, so that the fuses must blow very quickly in order to open the circuit and prevent further damage. The sudden drop in current which occurs when a fuse blows causes a large voltage transient in a circuit having substantial inductance, such as those containing motors, transformers, and/or relays. Such large voltage transients which accompany the blowing of a fuse often cause serious damage to equipment in the circuit.

Closing or opening a switch, as with a circuit breaker, must also be done rapidly in many situations. Development of high voltage transients, arcing, contact resistance, contact bounce, and contact capacitance are some of the problems that are encountered in practical switching.

U.S. Pat. No. 3,898,602 discloses a totally enclosed, non-vented expulsion fuse accommodating universal fuse links and providing non-violent expulsion fuse operation and time-current characteristics of the overhead-cutout-type operation in a completely underground power distribution system.

For cutting off currents of high intensity, greater than 1000 amperes and up to several million amperes, with very high excess cut-off voltages greater than 10,000 volts, very rapid opening electrical current breakers are provided as described in U.S. Pat. No. 3,848,099. Such a breaker comprises two coaxial conductor elements which are connected by a circular plate having the open end of an annular cup on one side and a gaseous detonating mixture within a closed chamber on the other side, whereby a heavy current detonates the mixture and drives a cutout annular portion of the plate into the cup, thereby breaking the current passing through the plate.

U.S. Pat. No. 3,728,657 describes an electric fuse having a current-sensing section and an arc-quenching section which are mounted within a non-conductive casing having conductive metal ends. The former responds to potentially hurtful overloads and to short circuits to initiate circuit-opening action. The latter immediately takes over and instantly completes the circuit-opening action. Because it does not have to complete the circuit-opening action, the circuit-sensing section can be small. The arc-quenching section includes lead-in wires of a pyrophoric metal which are connected to opposed ends of the current-sensing section and which are brought together in close proximity before being connected to the metal ends of the fuse. When the current-sensing section blows, an arc is established between the two wires which quickly burn away towards the metal ends of the electric fuse, thereby extinguishing the arc which cannot sustain itself over the increasing distance.

The problem of electric arc formation as switches are opened and closed in high-current electrical circuits, serving a plurality of electrical cells and carrying 300,000–500,000 amperes, is met according to U.S. Pat. No. 3,542,987 by using flexible, bowed straps of conductive material which are resiliently mounted and connected to secondary contact surfaces so that electrical arc formation is directed and absorbed by the secondary contacts as the switch is opened and closed.

For example, an elastomeric material (e.g., silicone rubber) may be homogeneously and highly loaded with silicon carbide powder and a lesser amount of a group IVB element-carbide powder, as described in U.S. Pat. No. 4,331,948. The material is placed across a semiconductor junction or between electrodes of a device to be protected so that when high-voltage surges appear across the junction or device, the material breaks down (conducts) before the junction or device is destroyed. Unlike a fuse, it repeatedly recovers.

It has also long been known to utilize non-metallic current-carrying conductors which are enclosed in insulating jackets or the like, and it has further been recognized that certain types of such non-metallic conductors display distributed resistance characteristics. Graphitized polyacrylonitrile (PAN) has been utilized in composite auto ignition cables, for example, such as those described in U.S. Pat. No. 4,369,423.

The yarns for such graphite filaments are produced by controlled pyrolysis of organic precursor fibers, and preferably by pyrolysis of PAN yarns or fibers. Typically, the PAN yarn is initially heated in an oxidizing atmosphere at temperatures of the order of 200°–250° C., subsequently in a non-oxidizing atmosphere to 1000° C. or above to carbonize the fibers comprising the yarn, and the thereafter to temperatures of the order of 1000° to 2000° C. to graphitize the materials and produce higher modular fibers.

Several patents, such as U.S. Pat. Nos. 3,673,035 to Whitney and 4,069,297 to Saito and British Pat. Nos. 1,257,481 to Rolls-Royce and 1,344,374 to Sosedov et al, disclose minimum carbonization temperatures on the order of 500° C. as a step in processes for improving the physical properties of the raw fiber, such as tenacity or Young's modulus. Other patents teach carbonization temperatures on the order of 700° C., such as U.S. Pat. Nos. 3,285,696 to Tsunoda, 3,497,318 to Nos, 3,533,743 to Prescott, 3,607,059 to Joo, 3,988,426 to Ogawa et al., 4,237,108 to Fukuhara et al. and 4,237,109 to Hiramatsu et al., and British Pat. No. 1,241,937 to Monsanto.

The conductive properties of carbon filaments have been exploited, for example, in making conductive moldable materials as discussed in U.S. Pat. No. 3,406,126 to Litant. It has also been proposed to employ low resistivity, pyrolyzed carbon fibers as light weight electrical conductors. Accordingly, changes in resistivity with pyrolyzation temperature, $T_p$, have been the subject of experimentation in the field.

The electrical conductivity of oxidized polyacrylonitrile (PAN) fiber has been studied as a function of heat treatment temperature between 710° F. and 950° K. See N. R. Lerner, "Electrical Conductivity and Electron- Spin Resonance In Oxidatively Stabilized Polyacrylonitrile Subjected to Elevated Temperature", *J. Appl. Phys.* 52 (11) November 1981. The article indicates that resistivity measurements were made after the resistance reading was constant for at least 1 minute. While Lerner reports variations in resistivity with pyrolyzation temperature, no non-ohmic effects are noted.

Brom et al have studied the conductivity of pyrolyzed polyimide (KAPTON) film as a function of pyrolysis temperature. Brom et al, "On New Conducting Polymer-Pyrolyzed Kapton", *Solid State Communications,* Vol. 35, p. 135 (Pergamon, 1980). Brom et al cut the pyrolyzed film into rectangular or needle shapes. At a controlled measurement temperature of 4.2° K., Brom et al report that no deviation from ohmic behavior was seen up to voltage gradient of $2 \times 10^3$ V/cm.

Gittleman et al postulate a structure for pyrolyzed polyimides in their article, "Are Pyrolyzed Polyimides Conducting Polymers?" *Journal of Electonic Materials,* Vol. 10, No. 2 (1981). Gittleman et al also suggest the application of higher fields to pyrolyzed polyimide samples to test the validity of a theoretical "charging energy" model.

The voltage transient is proportioned to the rate of change of the current and the size of the inductance in the circuit. Relays and transformers have 10–100's of millihenries, while motors may have inductances of many henries. Thus, the voltage transients which occur when a fuse blows can easily be thousands of volts and can cause considerable damage to equipment. There is consequently a need for a simple and inexpensive device that, as a part of the fusing system, can decrease the rate of change of the current in the circuit.

Electrical devices, made from fiber processed under selected conditions and used under selected bias and environmental conditions, exhibit switching behavior. This switching behavior embraces abrupt changes in device resistance in response to applied voltage and negative resistance in a portion of the voltage-current domain for the device.

Acrylic fibrous material may serve as a precursor material. Such materials may be prepared by conventional techniques and may be either an acrylonitrile homopolymer or n acrylonitrile copolymer which contains at least 85 mole percent of acrylonitrile and up to 15 mole percent of one or more monovinyl units copolymerized therewith.

One example of acrylic material employed is CELIOX TM brand fibers, manufactured for Celanese Corporation. These fibers are formed by thermal stabilization of a continuous filament acrylonitrile copolymer yarn comprising approximately 98 mole percent of recurrent acrylonitrile units and approximately 2 mole percent of recurring methyl acrylate units.

An example of suitable acrylic homopolymer is DRALON TM brand fibers, a commercial polyacrylonitrile homopolymer fiber manufactured by Farbenfabrik Bayer, Leverkusen, West Germany.

These exemplary precursor materials have a number of characteristics in common. They have an electrical resistivity of greater than $10^{10}$ ohm-cm. They may be partially pyrolyzed at temperature between 500° C. and 800° C. to produce material having an average small signal resistivity of from about one to $10^6$ ohm-cm at 25° C., measured at a current of less than 10 microamperes. Useful devices typically have an average small signal resistivity from 1 to 100 ohm-cm. at 25° C. When pyrolyzed, the materials generally retain the same general physical dimensions of the precursor. The materials do not form a skin or core of radically different composition when subjected to stabilization and pyrolysis.

Generally, the materials, with the novel electrical properties discussed below, are made by first stabilizing a yarn made from the fibers in a controlled atmosphere at temperatures less than 500° C. Typically, this stabilization step is pre-oxidation performed in air or an oxygen-enriched atmosphere. The materials are then pyrolyzed in an atmosphere essentially free of oxygen and moisture at temperatures of from 500° C. to 800° C. in a furnace. The yarn is cooled to room temperature in the controlled atmosphere.

Individual filaments may be mounted for electrical testing in a device consisting of a single pyrolyzed filament placed on a ceramic substrate. Metallic electrodes may be evaporated onto the filament and substrate, leaving exposed an active portion of the filament having a selected length. Electrical leads may then be attached to the evaporated electrodes. Single filament electrical switches have been fabricated with active portions varying from about 2 to 30 mils in length although an electrical switch has been made of a composite of fibers, each about 100 mils in length. The small size of the active element may be of benefit in miniaturizing circuitry employing the fibers. The resulting structure is a bipolar electrical device, whose electrical properties may be measured employing a test apparatus.

Such a test apparatus includes a function generator for applying a level biasing voltage, sine wave, or single or multiple pulses (square wave or ramp voltages) to the electrical device under test. A limiting resistor may be placed in circuit with the device and function generator to prevent overload of the device when it switches to a more highly conductive state. Current flowing through the device also flows through a current sense resistor.

A ramp voltage of selected duration and amplitude can also be applied to the device in series with the current sense resistor. Current and voltage measurements can be combined in a electronic curve tracer to provide a V-I curve for the device under test.

SUMMARY OF THE INVENTION

It is accordingly an object of this invention to provide a method and a means for eliminating the large electrical transients which accompany the blowing of a fuse.

It is additionally an object to provide a fuse by-pass device having an initiating voltage that is lower than the fuse blowing voltage.

In accordance with these objects and the principles of this invention, Applicants have developed a shunt device and a method for protecting electrical equipment when a fuse blows by utilizing certain useful, non-ohmic voltage-current characteristics of partially pyrolyzed polymer materials, especially short segments of partially pyrolyzed polymer filament. This shunt device establishes a bypass across the fuse for permitting a limited amount of current to begin to flow at a lower voltage than the fuse blowing voltage and before the fuse blows, thereby serving as a transitory relief valve for a portion of the current while minimizing or even substantially eliminating the inductive spike when the fuse blows.

The by-pass device is made of at least one partially pyrolyzed polyacrylonitrile fiber (PPP) which is selected to have a switching voltage that is less than the voltage drop across the fuse before the fuse blows. When wired across the fuse as a shunt, the PPP fiber switches to a low resistance state while the fuse is blowing. When the fuse and PPP characteristics are properly matched, the rate of change of the voltage with time is lowered, thus selectively decreasing the size of the voltage transients which occur after the fuse blows.

One method of obtaining a switching voltage that is lower than the voltage which develops across the fuse before it blows is to use a narrow gap across the PPP filament. However, it is desirable to use a larger gap in order to minimize arcing.

Such a wider gap can be provided because the switching voltage and low field resistivity both decrease with increasing heat treatment. Larger-current fuses and circuit breakers can also be modified to include rope or bundles of fibers or several fibers in parallel.

It is additionally of practical importance that fibers are useful for eliminating large voltage transients because they permit packaging similar to that used in existing fuses, such as instrument fuses, for example.

BRIEF DESCRIPTION OF THE DRAWINGS

FIGS. 2, 5, and 8 are V-I diagrams at 400 V peak FS, and the remaining Figures are at 200 V peak FS.

DESCRIPTION OF THE PREFERRED EMBODIMENTS

Figure 1:
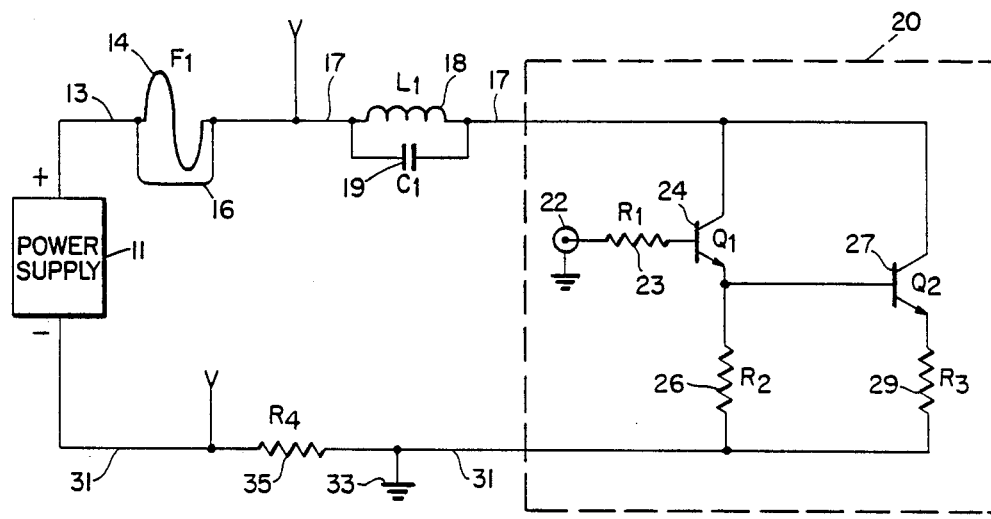
FIG. 1 is an electrical diagram which includes a crowbar circuit to simulate a circuit failure.
Figure 2:
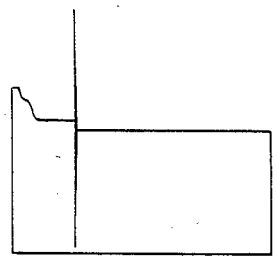
FIGS. 2-10 are V-I diagrams obtained by testing 1/16 amp fuses with the circuit of FIG. 1.
Figure 3:
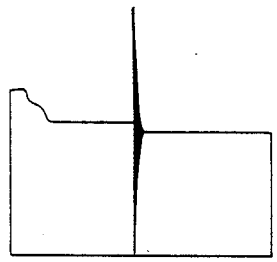
Figure 4:
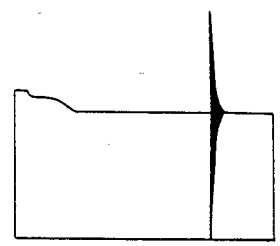
Figure 5:
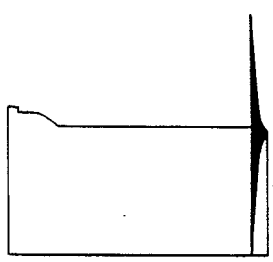
Figure 6:
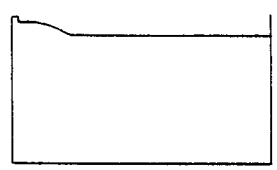
Figure 7:
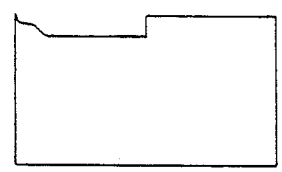

The invention may be more completely understood by reference to the following Examples which refer to the drawings and furnish illustrative and test data.

Examples 1-5 serve as background information on the development and testing of the active material.

Examples 6-12 provide background on the characteristics of the testing circuit and the fuses which will be used.

Examples 13-21 illustrate the invention described hereinbefore.

EXAMPLE 1

A heat stabilized CELIOX polyacrylonitrile filament yarn, grade CP-1000, containing about 1000 filaments was placed in a ceramic split tube furnace with both ends of the yarn protruding from the furnace. The heat stabilized yarn previously had been formed by heating the acrylic fibrous material in an air atmosphere at a temperature below 300° C. until it was black in appearance, non-burning when subjected to an ordinary match flame, and possessed a bound oxygen content of at least 7 percent by weight when subjected to the Unterzaucher elemental chemical analyses. In order to avoid excessive catenary and maintain polymer orientation, each end of the yarn was guided over a pulley and provided with a 30 gram weight so as to keep the yarn under tension at all times. The furnace used for the pyrolysis was made by the Mellen Co., (Model 2-321-4) and included the necessary temperature and power supply control units to provide a controlled, uniform temperature heat zone (flat zone), about 12-15 inches long, in the center of the furnace. A flow of nitrogen of purity greater than 99% facilitated exclusion of air and moisture from the flat zone. The furnace was then heated to 677° C.±3° C. in the central zone in about 15 minutes and held at that temperature for 30 minutes, whereupon the power was shut off and the yarn allowed to cool to near room temperature. After removal of the yarn from the furnace, a 4-5 inch center section was cut out of the yarn and used as a source of filament.

A single filament was removed from a yarn, the filament being about 8 micrometers (microns) in diameter with a linear density of about 1.1 denier. The filament was cut to a length of about ½ inch and mounted on a ceramic substrate about one inch square and 0.030 inches thick for electrical evaluation. The filament was first attached to the substrate by painting on a strip of flexible silver paste (silver paste #13 made by Engelhard Industries, Inc.) The paste was then air cured in an oven at 100° for 30 minutes. This procedure immobilized the filament on the substrate. Next, the substrate was pressure fitted into a matching mask. The mask, made of aluminum sheet metal and copper wire, was constructed so as to permit evaporation of a metal coating over most of the filament, except for a masked-off central section of variable, controllable length between 25-125 microns. After evaporation, the masked region constituted the electrically active portion of the electrical device. The substrate-mask assembly was then placed in a Vacuum Coater (Edwards Ltd., Model E306 A) which was used in a standard fashion to evaporate a conductive silver layer over the outer portion of the sample filament at a rate which deposited a layer about 1 micron thick in 45 minutes. The width of the uncoated central section ("gap") was about 75 microns (approximately 3 mils). After the substrate was withdrawn from the coater and the mask removed, copper connecting wires about 125 microns in diameter were attached to each side of the uncoated filament section by means of the above-described silver paste, applied over the evaporated silver coating. The silver paste was then air cured in an oven.

For evaluation of the voltage-current characteristics, the device was connected in series with a function generator and a non-inductive metal film limiting resistor. The instantaneous current and voltage values were measured across the limit resistor (100K ohm, 1%) and the sample filament, respectively, using the differential amplifiers of a digital oscilloscope (Nicolet Instrument Co., model 2090-III) which digitized the reading to provide 1024 data points on each channel and stored them on a soft disc for display, as needed. The power was applied as a single, linearly increasing ("ramp") voltage pulse, originating from the sweep generator of a Tektronix, model 5112, oscilloscope and amplified by a suitable power amplifier. The pulse width was 18 milliseconds, and the maximum voltage output was adjusted manually upward until the V-I curve became highly non-linear.

The electrical measurements were performed at room temperature in a dry nitrogen atmosphere. Initially, the small signal filament resistance was 358K ohms, producing a V-I curve comprising an approximately linear portion followed by a sudden increase in current to a point at which the voltage across the sample reached a limiting value ("knee" voltage) and dropped rapidly thereafter with the current increasing until limited by the 100 K ohm resistor. In this case the "knee" or breakover voltage was about 12.0 volts and the current of 99.5 microamperes. This corresponds to an effective resistance of about 120K ohms at the knee that decreased rapidly with increasing current to a value as low as 6.5K ohms at 1.74 milliamperes and 7.0 volts, i.e. a resistance ratio of about 55 between the initial and the final states.

EXAMPLE 2

A second sample of stabilized CELIOX polyacrylonitrile filament yarn, grade CP-1000, was heat treated in the Mellen furnace as described in Example 1, except that the heat treatment temperature was 500° C.±3°+C. and the heat-up time to that temperature was 45 minutes. A single filament from this yarn was mounted on the ceramic substrate, and a contact layer of silver evaporated in the same manner as described above, except that the uncoated gap width was about 50 microns. The filament diameter and denier were virtually the same as in Example 1.

Using the aforementioned electrical test apparatus, it was observed that the V-I curve was practically linear when the measurement was carried out at or near room temperature in nitrogen or vacuum. The low voltage d.c. resistance of the non-metallized filament section was about $24.8 \times 10^8$ ohms. The device was then enclosed in a nitrogen filled air-tight stainless steel vessel which was then progressively heated to about 150° C. by means of an external heating tape. When the vessel temperature reached 135° C., a very high degree of non-linearity occurred. At that point the "critical" voltage was about 541 volts and the corresponding current was about 98 microamperes. The low current d.c. resistance at 135° C. was about $2.8 \times 10^8$ ohms. The critical voltage was observed to decrease with increasing temperature and was 423 volts at the maximum measured temperature of 153° C. in a partial vacuum. The V-I curve showed an extremely steep climb beyond the critical voltage, indicating the utility of such a material for voltage limiting devices. In subsequent tests, the V-I behavior of this filament was studied further at a range of temperatures between 75° C. and 180° C. at pressures of about $10^{-6}$ to $10^{-7}$ Torr. When this was done, the device exhibited negative resistance similar to that observed for acrylic fiber samples pyrolyzed at higher temperatures.

EXAMPLE 3

A third sample of stabilized CELIOX polyacrylonitrile filament yarn, grade CP-1000, was pyrolyzed as described in Example 1 except that the heat treatment temperature was about 721° C. Approximately 1000 filaments from the yarn were mounted and contacted. The filaments were aligned so that the were approximately parallel. Silver paste was then applied to connect the filaments to electrical leads and to define active portions of the filaments of about 2.5 millimeters in length.

Using the aforementioned electrical test apparatus, it was observed that the device exhibited a switching breakover voltage of about 66 volts at room temperature. However, the current at the switching knee was much larger than the current observed at the switching knee for single filament devices; specifically this current was about 80 milliamps, or about three orders of magnitude greater than the current observed for the single filament sample of Example 1.

The results of Example 3 indicated that high current devices could be constructed from multi-filament composites by potting parallel filaments in a non-conductive resin. The potted filament could then be lapped to the desired thickness. Electrodes could next be applied to the faces for the device to provide electrical connection to the leads.

EXAMPLE 4

A stabilized CELIOX polyacrylonitrile filament yarn, grade CP-1000, was pyrolyzed in the same general manner as described in Example 1 except that the heat treatment temperature was about 800° C. A single filament from this yarn was mounted on a ceramic substrate, and a contact layer of silver was evaporated in the same manner as described above. The uncoated gap width was about 50 microns.

Electrical switching behavior could not be observed in the sample at room temperature. However, when the device was cooled to −195° C., a switching knee was observed where the knee volta $V_{BO}$ was about 4.4 volts and the knee current was about 441 microamps.

The small signal resistance of the sample at −195° C. was about 17.5K ohms. This was the lowest small signal resistance thus far observed in a pyrolyzed filament device which exhibited switching behavior. In contrast, the small signal resistance of this device at room temperature was about 3K ohms.

The cross-sectional area of the filament was on the order of $10^{-6}$ cm$^2$, and as noted above, the filament length was about 50 microns. Therefore the average resistivity of the device was about 3.5 ohm-cm at minus 195° C.

Samples of acrylonitrile fibers pyrolyzed at about 600° C., with active lengths between 0.4 and 0.7 millimeters, had relatively high small signal resistances: from about $10^7$ to $10^{12}$ ohms. In a number of such devices, no switching behavior was observed.

At the other end of the scale, samples of acrylonitrile fibers, pyrolyzed at about 800° C. with active length between 0.4 and 0.7 millimeters, had relatively low, small single resistances of about $10^4$ ohms. None of these devices exhibited switching behavior at room temperature. However, as noted above, the device of Example 4, when cooled to minus 195° C., did exhibit switching behavior.

This data indicates limitations on the pyrolysis temperatures used in fabricating devices for use at low voltages and in environments near room temperature.

EXAMPLE 5

A sample of Dralon polyacrylonitrile filament yarn (denier 2.0 dpf), that was stabilized at 220° C. to 270° C. for 4 hours in a flowing air stream, was heated to 450° C. in pure nitrogen flow in 10 minutes and held at 450°±3° for 20 minutes. After cooling to room temperature, a single filament was extracted and mounted on a ceramic substrate with the gold paste (Cermalloy ® 4350L), defining an active portion of the filament about 25 mils in length. The mounted sample was then given a final heat treatment at about 675° for 30 minutes.

Using the aforementioned apparatus, electrical tests were performed on the device in nitrogen. The low voltage d.c. resistance of the device was about 2 megaohms at room temperature.

V-I curve traces were made for the device at each of four temperatures: 24.8° C., 50.4° C., 75.7° C., and 99.5° C. A 100K ohm limiting resistor and 25 millisecond ramp voltage pulse were employed. A gradual decrease in the value of the breakover voltage with an increase in temperature was obtained.

EXAMPLE 6

Measurements were made on a circuit containing a 1/16 ampere instrument fuse and a 2.5 millihenry inductor. Four milliseconds after a current surge of 350 milliamperes, the fuse blew. The sudden drop in current, from 350 milliamperes to zero in less than three microseconds, created a voltage transient of 240 volts.

EXAMPLES 7-12

The circuit shown in FIG. 1 was built with power source 11 generating 20-40 volts D.C. It was connected by wire 13 to fusible element 14. Wire 17, attached to the other side of fusible element 14, and to one side of crowbar circuit 20. The other side of crowbar circuit 20 was connected by wire 31 to ground 33, resistance 35, and finally to the negative side of power source 11. PPP shunt 16 was omitted in these circuit tests.

Crowbar circuit 20 comprised gate-in 22, resistances 23, 26, and 29, and transistors 24 and 27. Resistance 29 was included in circuit 20 to establish a quiescent or idle current ($I_{set}$) that was somewhat less than the fuse rating in order to simulate actual operating conditions. Within crowbar circuit 20, transistor 24 was a 2N3053, and transistor 27 was a 2N3055. Resistance 23 was 1,000 ohms, resistance 26 was 332 ohms, and resistance 29 was 10.4 ohms.

Fusible element 14 was changed for each test. Resistance 35 was 1 ohm, 1%.

Current was set during a long (10 second) gate-in with a 20 ampere fusible element 14 in a fuse holder. Gate-in 22 was +2 to +4 volts pulse (or D.C.) at 70 $\mu$a maximum.

The exploratory data are given in Table I with $I_{max}$ indicating the crowbar current of circuit 20, using current sense resistor of 1 ohm, $E_{set}$ as the power source voltage, $\Delta E$ as the voltage drop across fusible element 14 before the fuse blew, and "delay" the duration of time from initiating of crowbar circuit 20 to opening of fusible element 14. The crowbar duration was 3962 $\mu$sec.

TABLE I

| Ex No. | I max., ma | E set, v | $\Delta E$, v | Delay, msec | Fuse 14 amp. | $\Omega$ |
|---|---|---|---|---|---|---|
| 7 | 100 | 29.94 | 14.54 | — | 1/32 | 32.2 |
| 8 | 100 | 29.94 | 14.54 | — | 1/32 | 32.2 |
| 9 | 100 | 29.94 | 14.54 | 0.5 | 1/32 | 32.2 |
| 10 | 303 | 35 | — | 4.4 | 1/16 | 21.2 |
| 11 | 351 | 35 | 24 | 3.4 | 1/16 | 21.2 |
| 12 | 351 | 39.72 | — | 2.9 | 1/16 | 21.2 |

EXAMPLES 13-21

The circuit shown in FIG. 1 was then explored with the objective of generating large voltage spikes and to create a model that would demonstrate possible use and performance of a PPP shunt across fusible element 14. Inductance 18 (3 mh choke) and capacitance 19 (330 pf) in series with wire 17. Capacitance 19 was added to lower the frequency of ringing.

Using the circuit in FIG. 1, tests were made with AGX and MKB fuses, both rated at 1/16 ampere, as fusible element 14 and with a partially pyrolyzed polyacrylonitrile fiber (PPP) 16 (CP 1-700, 2 mil gap) placed in parallel with fusible element 14. Each fuse had a maximum current rating of 1/16 ampere and a low current resistance as shown in the third column. The low current resistance of the AGX fuse was 21.2 ohms. The low current resistance of the MKB fuse was 4.1 ohms. As indicated in Table II, the output voltage of the power supply was in the range of 35-40 volts. The figure in the drawings corresponding to each example is listed in the second column.

The resistance of the PPP at low current is given in the fourth column. The column marked "PPP HTT" contains the heat treatment temperature of the PPP that was used.

The voltage output of the power supply is shown in the column headed by "$E_{set}$". The current used to blow the fuses is listed in the column headed by "$I_{max}$".

The delay in time from each increase in current to $I_{max}$ to the time when each fuse actually blew is furnished in the column headed "Delay, msec". The maximum voltage across each fuse (and the PPP when there) before the fuse blew is given in the column headed "Fuse, $E_{max}$".

The maximum or peak voltage generated when each fuse blew is given in the column headed "$E_{PK}$". It should be noted that all runs without PPP went off scale; so only the full scale voltage is shown. The results in Table II show that the PPP shunted across the fuses in Examples 17, 18, 20, and 21 provided excellent transient suppression.

Figure 8:
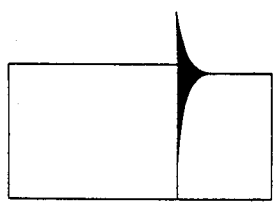
Figure 9:
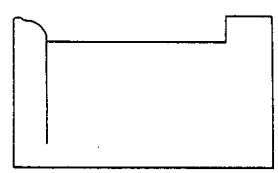
Figure 10:
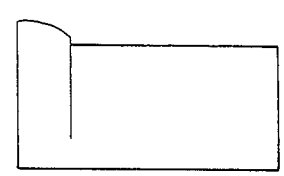

Suppression of voltage spikes was best when an AGX fuse was used because of its high initial resistance and long delay before blowing. This made it easier for the PPP to switch to a lower resistance state before the fuse blew. However, substantial suppression of the voltage oscillation was also achieved with MKB fuses, as depicted in FIGS. 9 and 10, as compared to FIG. 8.

Because it will be readily apparent to those skilled in the art of protecting electrical devices from excessive currents that innumerable variations, modifications, amplifications, and extensions of the examples and principles hereinbefore set forth can be made without departing from the spirit and the scope of the invention, what is hereby defined as such scope and is desired to be protected should be measured, and the invention should be limited, only by the following claims.

TABLE II

| EXAMPLE No. | FIG. No. | FUSE OHMS | PPP RBT | PPP HTT | E SET | I MAX | DELAY M SEC | FUSE Emax | E PK | FUSE TYPE |
|---|---|---|---|---|---|---|---|---|---|---|
| 13 | 2 | 21.2 | — | — | 35.2 | 303 | 4.4 | 30.0 | >102 | AGX |
| 14 | 3 | 21.2 | — | — | 35.2 | 351 | 3.4 | 29.8 | >102 | AGX |
| 15 | 4 | 21.2 | — | — | 39.7 | 351 | 2.9 | 34.5 | >205 | AGX |
| 16 | 5 | 21.2 | — | — | 39.4 | 355 | 3.7 | 34.5 | >205 | AGX |
| 17 | 6 | 21.2 | 229K | 700 | 39.4 | 355 | 3.9 | 34.5 | 5.4 | AGX |
| 18 | 7 | 21.2 | 219K | 700 | 39.5 | 355 | 3.9 | 34.5 | 5.7 | AGX |
| 19 | 8 | 4.1 | — | — | 39.4 | 353 | 1.2 | 10.4 | >405 | MKB |
| 20 | 9 | 4.1 | 670K | 700 | 39.7 | 353 | 0.85 | 23.9 | 167 | MKB |
| 21 | 10 | 4.1 | 90K | 700 | 39.6 | 353 | 0.83 | 23.8 | 153 | MKB |

What is claimed:

1. An electrical fuse having a minimized voltage transient, comprising:

A. a fusible element which is connected at its ends to an electrical circuit and which blows at a selected excessive current, causing a substantial voltage drop to occur across said fusible element as said excessive current begins to flow and before said fusible element blows; and B. a selectively pyrolyzed polyacrylonitrile fiber which is connected at its ends to said element ends and which has a low resistance state and a switching voltage which is less than said voltage drop, said low resistance state and said switching voltage being matched to the characteristics of said fusible element so that said fiber switches to said low resistance state when said switching voltage is exceeded and while said fuse is blowing, thereby lowering the rate of change of voltage with time and decreasing the size of said voltage transient which occurs after said fuse blows.

2. A shunt device which is used to protect electrical equipment when a fuse blows at a selected blowing voltage by minimizing the inductive spike which occurs when said fuse blows, said device comprising a by-pass across said fuse for permitting a limited amount of current to begin to flow at a lower voltage than said blowing voltage and before said fuse blows, thereby serving as a transitory relief valve for a portion of said current.

3. The shunt device of claim 2, wherein said by-pass is at least one partially pyrolyzed polyacrylonitrile fiber which is wired across said fuse as a shunt.

4. A method of suppressing an electrical transient having a transient path within a circuit, comprising:

A. connecting a fusible link in said transient path, said fusible link developing a voltage drop thereacross before blowing thereof; and B. connecting at least one partially pyrolyzed polyacrylonitrile fiber in parallel with said fusible link, said fiber being capable of switching to a low resistance state while said fusible link is blowing and at a switching voltage that is less than said voltage drop, whereby the rate of change of said electrical transient with time is lowered, thus selectively decreasing the size of said electrical transient.

5. The method of claim 4, wherein said voltage drop is 24–30 volts.

6. The method of claim 5, wherein said switching voltage is controlled by the extent to which said fiber is pyrolyzed.

* * * * *